CORE CARRYING STAND.
APPLICATION FILED JAN. 20, 1916.
1,181,639.
Patented May 2, 1916.
2 SHEETS—SHEET 1.
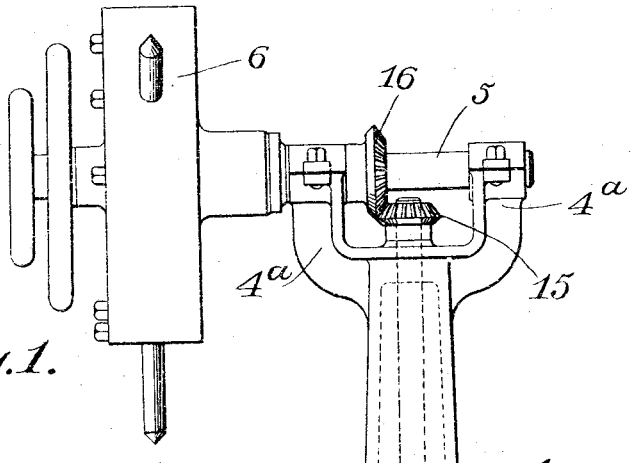
Fig. 1.
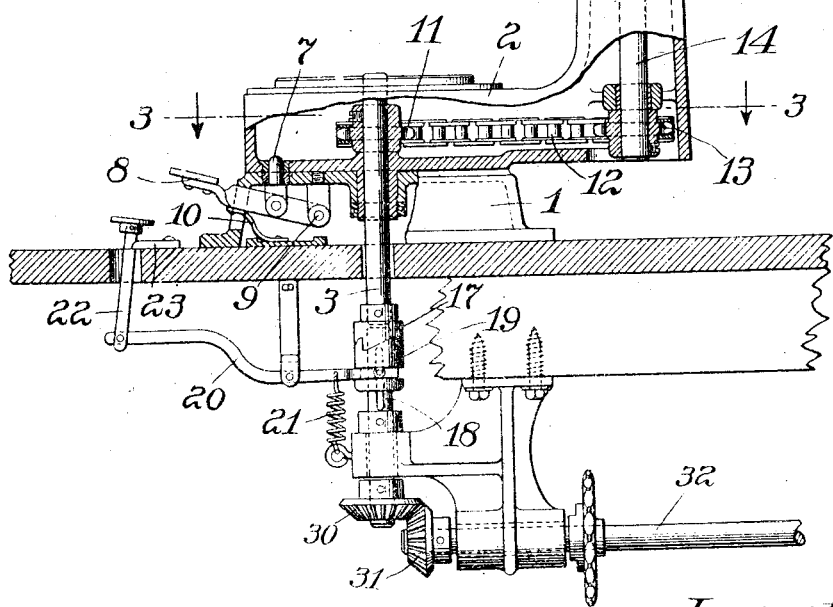
Inventor:
Ferdinand F. Brucker;
by Spear Middleton Donaldson & Spear
Attys.

F. F. BRUCKER.
CORE CARRYING STAND.
APPLICATION FILED JAN. 20, 1916.

1,181,639.

Patented May 2, 1916
2 SHEETS—SHEET 2.

Inventor:
Ferdinand F. Brucker,
by Ofsear Middleton Donaldson & Ofsear
Att'ys.

UNITED STATES PATENT OFFICE.

FERDINAND FRANCIS BRUCKER, OF AKRON, OHIO, ASSIGNOR TO THE MILLER RUBBER COMPANY, OF AKRON, OHIO, A CORPORATION OF OHIO.

CORE-CARRYING STAND.

1,181,639.  Specification of Letters Patent.  Patented May 2, 1916.

Application filed January 20, 1916.  Serial No. 73,226.

*To all whom it may concern:*

Be it known that I, FERDINAND F. BRUCKER, a citizen of the United States, residing at Akron, Ohio, have invented certain new and useful Improvements in Core-Carrying Stands, of which the following is a specification.

My present invention relates to improvements in means for supporting cores, upon which tires are built, and is more particularly designed for supporting the cores with the carcass or fabric body of the tire applied thereto, while the finishing strips of rubber are being placed on the carcass.

The invention has among others for its object to provide a core support which may be readily rotated by the operator to bring either side of the core into position for manipulation without requiring the operator to move from one point to another.

A further object is to provide a core supporting device which will be capable of being moved or oscillated upon a vertical axis and which will be power driven in any position to which it may be adjusted.

With these and other objects in view, the invention includes the novel features of construction and arrangement and combination of parts hereinafter described and particularly defined by the appended claims, an embodiment of the invention being illustrated in the accompanying drawings, in which—

Figure 2:
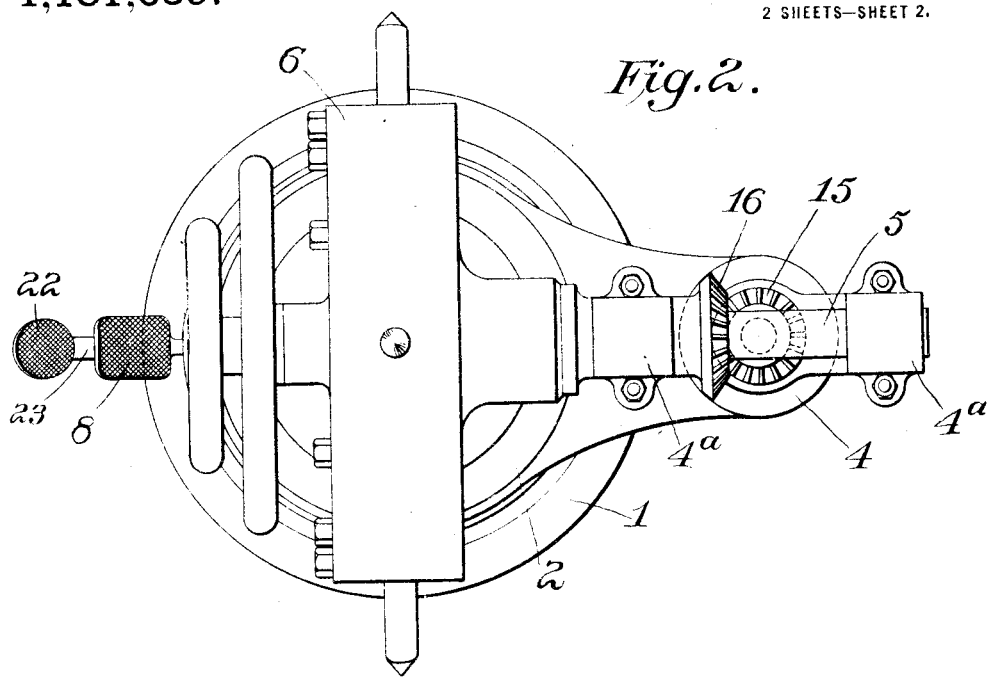
Figure 3:
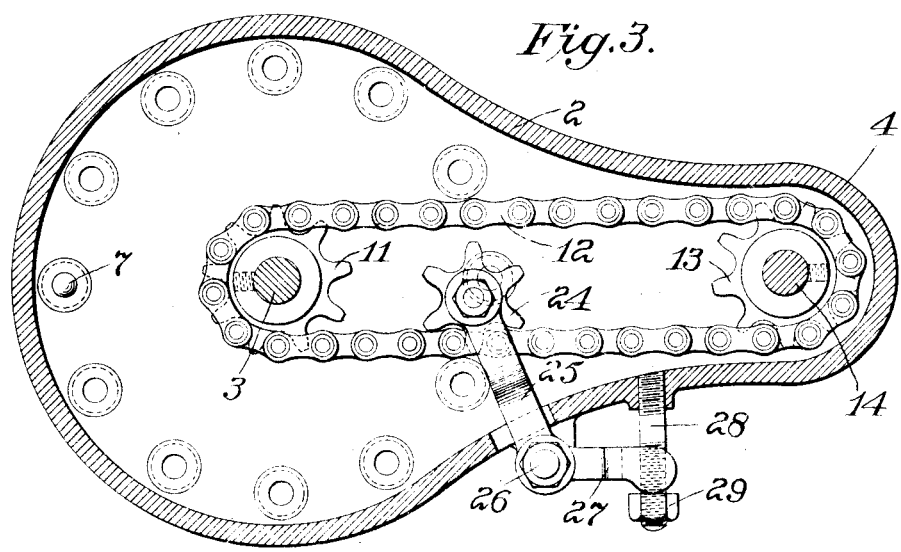

Figure 1 is a side elevation, partly broken away. Fig. 2 is a plan view. Fig. 3 is a horizontal section on line 3—3 of Fig. 1.

Referring by reference characters to this drawing, the numeral 1 designates a suitable base, upon which is mounted a rotatable member 2, which I may conveniently term a turn-table. Passing upward centrally through the base and into the turn-table is a power driven shaft 3, which may be driven from any suitable source of power and in any suitable manner, this shaft 3 serving as the axis of rotation of the turn-table. Projecting upwardly from one side of the turn-table and preferably from an extension thereof, which avoids the necessity of unduly enlarging the turn-table, is a standard 4 which carries at its upper end arms 4ª. These arms 4ª carry suitable bearings, in which is journaled a horizontal shaft 5 which projects laterally from said bearings over the turn-table. Secured to the projecting portion of the shaft is a core carrying chuck which is indicated at 6, and is intended to be representative of the ordinary or any desired form of chuck, its position on the shaft being such that the axis of the turn-table will lie in the vertical plane of the core carried by the chuck. From this arrangement it will be seen that by merely rotating the turn-table with its supporting standard, the core may be turned to bring either side or the periphery thereof into convenient position for the operator without requiring the latter to change his position. This also enables the core to be reversed without changing its alinement with any mechanism which may be located adjacent thereto for operating upon the tire being formed on said core.

For locking the turn-table in any position to which it may be adjusted, I provide a locking bolt or pin 7 connected to a foot lever 8, pivoted to a lug projecting from the base, as indicated at 9, and normally pressed upward by a spring 10 to cause said pin to engage in any one of the series of recesses formed in the bottom plate of the turn-table.

For rotating the chuck and core without regard to any position in which it may be adjusted, I provide suitable operating connections extending up through the standard 4, which is made hollow for this purpose. Such operating connections, in the form shown, comprise a sprocket wheel 11 fast on shaft 3 within the turn-table and connected by a sprocket chain 12 with a sprocket 13 fast on a vertical shaft 14, journaled in suitable bearings in the standard. This shaft 14 carries at its upper end a beveled gear 15, meshing with a second beveled gear 16 fast on the shaft 5.

In order that the operator may control the movement of the shaft 3, to enable the core to be driven or stopped at will and when stopped to be rotated by hand when desired, I interpose between the shaft 3 and its source of power a clutch. This may conveniently be effected by providing the shaft 3 with a clutch member 17, fast thereon and providing in line with this, a power driven shaft 18, to which is splined a second clutch member 19, designed to be operated by the fork of a clutch lever 20. Such lever may be normally placed under the tension of a spring 21, operating to disengage the clutch, and said clutch member 19 may be moved into position to engage clutch member 17 by a treadle 22 placed in position convenient for operation by the foot of the operator and having a notch adapted to be engaged, by a slight lateral movement of the treadle, with a dog 23, affixed to the floor or base of the machine.

In order to take up any slack in the chain, I provide an idle sprocket 24, meshing with the chain and carried by an arm 25, pivoted upon a pivot pin 26, carried by the turn-table, this arm having a projecting portion 27 provided with a fork to embrace a bolt 28, on which is threaded a knot 29 to bear against the fork portion of said projection.

In the drawings I have shown shaft 18 as driven through bevel gears 30 and 31 from shaft 32, which latter may be driven in any suitable manner and in either direction at any desired speed.

If desired, the means for reversing the direction of rotation of the core may be applied in connection with shaft 5 by providing an additional bevel gear opposed to gear 16 and meshing with gear 15 and providing suitable clutch mechanism for alternately connecting gear 16 or the opposing gear to said shaft.

Having thus described my invention, what I claim is:—

1. A tire core carrying chuck, mounted to rotate about a horizontal axis and also about a vertical axis, and means for rotating said chuck on its horizontal axis without regard to its position on said vertical axis.

2. A tire core supporting apparatus comprising a chuck, a support therefor, upon which said chuck is mounted to rotate about a horizontal axis, said support being mounted to rotate on a vertical axis, and means operative to rotate said chuck in all positions of said support.

3. In combination, a base, a turn-table mounted thereon, a standard carried by said turn-table offset from the axis thereof, a core carrying chuck journaled in the upper end of said standard, and power means for rotating said core carrying chuck.

4. In combination, a base, a turn-table mounted thereon, means for locking the turn-table to the base at any desired position, a standard carried by said turn-table offset from the center thereof, a chuck carrying shaft journaled in horizontal bearings at the upper end of said standard and power means for rotating said shaft.

5. In combination, a base, a hollow turn-table mounted thereon, a hollow standard carried by said turn-table, a horizontal chuck carrying shaft journaled at the upper end of said standard, a power driven shaft located within the turn-table with its axis coincident with the axis of the turn-table, a vertical shaft within the standard connected to be driven by said first named shaft, and driving connections between the shaft and the standard and said chuck carrying shaft.

6. In combination, a base, a hollow turn-table mounted thereon, a hollow standard carried by said turn-table, a horizontal chuck carrying shaft journaled at the upper end of said standard, a power driven shaft located within the turn-table with its axis coincident with the axis of the turn-table, a vertical shaft within the standard connected to be driven by said first named shaft, and driving connections between the shaft and the standard and said chuck carrying shaft, and means for connecting and disconnecting the chuck carrying shaft with the source of power at will.

In testimony whereof, I affix my signature.

FERDINAND FRANCIS BRUCKER.